Nov. 20, 1951
C. E. MAY
2,575,967
SPHERICAL, ROTARY, CONVEYER
TYPE TRAP CHAMBER DISPENSER
Filed Jan. 17, 1947
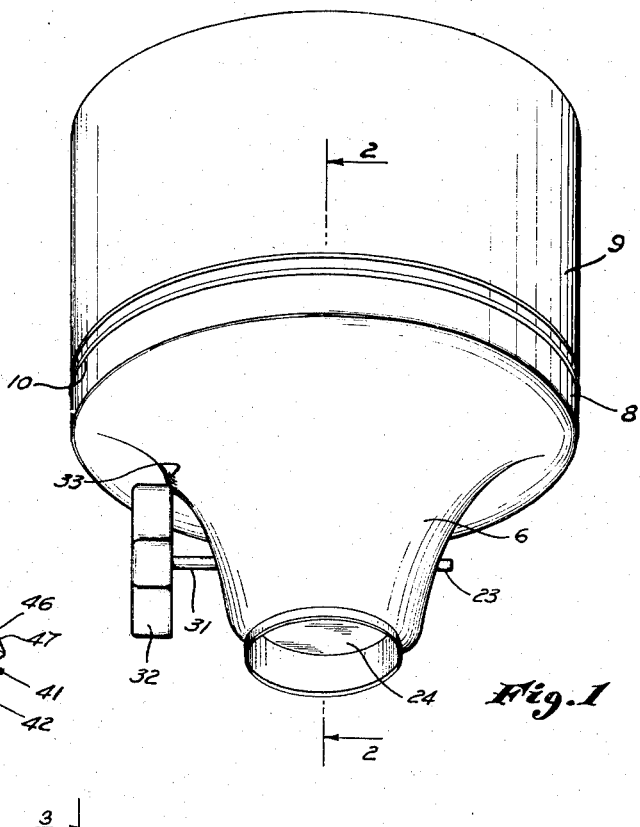
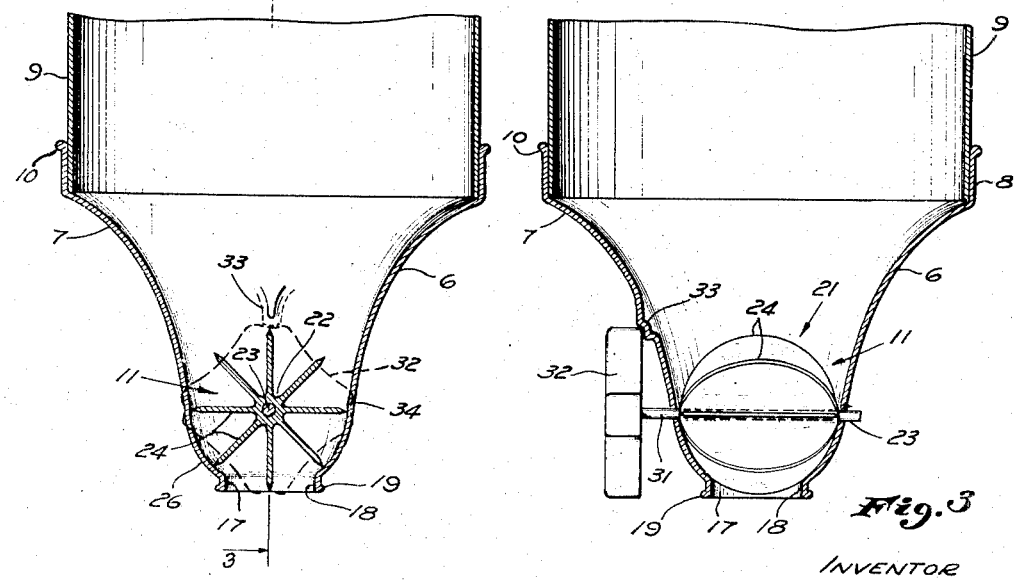
INVENTOR
CECIL E. MAY
ATTORNEY Patented Nov. 20, 1951

2,575,967

UNITED STATES PATENT OFFICE 2,575,967

SPHERICAL ROTARY CONVEYER TYPE TRAP CHAMBER DISPENSER

Cecil Edgar May, Sierra Madre, Calif.

Application January 17, 1947, Serial No. 722,655

2 Claims. (Cl. 222—368)

This invention relates to improvements in dispensers, and more particularly to devices for dispensing measured quantities of dry granular material such as coffee, sugar, flour, soap powder, and the like.

It is an object of my invention to provide a device for dispensing material in measured quantities, which constitutes an improvement over previously available devices of this general character in that it is adaptable to certain manufacturing processes which reduce its cost to a minimum without, however, any sacrifice in matters of efficiency, accuracy, appearance, or ease or dependability of operation.

A more detailed object in this same connection is to provide a measuring and dispensing device of such design that the hopper and measuring chamber portions thereof are well suited to rapid and inexpensive production from sheet metal by a simple stamping or spinning process.

A further object of my present invention is to provide a measuring and dispensing device of the character described adapted to be caused to dispense an accurately measured quantity of material simply by turning an actuating handle through a distance determined by a suitable "click mechanism" adapted not only to indicate to the operator when the handle has been turned far enough to complete a full cycle of operation of the device but, also, to retain the handle stationary against inadvertent displacement until the next time an operator intentionally actuates the device.

A still further object of my invention is to provide a measuring and dispensing device for dry granular or powdered material such as ground coffee, which is adapted to be placed in position upon the can in which coffee is commonly sold, in place of the can's regular lid, and which adds to the convenience afforded by using the device by eliminating the necessity of opening the coffee can in order to obtain for use the desired portion of the can's contents.

The invention possesses other objects and valuable features some of which, with those enumerated, will be set forth in the following description of the preferred embodiment of my invention illustrated in the drawing accompanying and forming a portion of the specification. It is to be understood that I do not limit myself to the showing made by the said drawing and description but that I may adopt variations of the preferred form within the scope of the invention as defined by the claims.

Referring to the drawings:

Figure 1 is a perspective view showing a measuring and dispensing device incorporating the principles of the present invention, installed in operative position upon a conventional coffee can.

Figure 2 is a transverse, vertical, medial sectional view, the plane of section being indicated by the line 2—2 of Figure 1 with the direction of view as indicated. A portion of the figure is broken away to reduce its size.

Figure 3 is a transverse, medial sectional view taken on the line 3—3 of Figure 2 with the direction of view as indicated.

Figure 4 is an enlarged detail view showing a slightly modified form of "click mechanism."

Whereas the measuring and dispensing device of the present invention is adaptable for use in connection with substantially any type of dry granular or powdered material, that form of my invention which has been selected for illustration and description herein, is intended for use in dispensing ground coffee in the accurately measured small quantities which will afford the greatest convenience in ordinary household use. With this purpose in view, the dispenser illustrated in the drawing comprises a hopper 6 of substantially bell- or funnel-shaped form having a relatively large mouth 7 so proportioned that a cylindrical flange 8 formed on the larger end of the bell 6 projecting outwardly therefrom fits relatively tightly upon the top of a conventional can 9 of the type in which ground coffee is commonly sold in one or two pound quantities. It is intended that the cover provided with the can at the time of the sale be removed, leaving the top of the can open so that the measuring and dispensing device of the present invention can be placed upon the can in lieu of the cover where it will be permitted to remain until the entire contents of the can have been dispensed. Preferably the extreme outer end of the flange 8 is provided with a reinforcing bead 10 which not only strengthens the open end of the device so as to aid in its retention in a circular form, but it also removes the hazard which might otherwise be present were the end of the flange 8 left sharp.

The foremost end of the bell 6 is provided with a measuring chamber 11 which is of reasonably accurate hemispherical form except for the fact that the extreme lower end of the hemispherical chamber 11 is provided with an outlet or discharge opening 17 preferably defined by a cylindrical flange 18 the extreme lower end of which also is provided with a reinforcing bead 19.

Because of the described form of the bell portion 6, the attaching flange 8, and the measuring chamber 11, these portions of the apparatus lend themselves with particular efficiency to be manufactured from inexpensive sheet metal of suitable gauge and by an inexpensive manufacturing process involving either die stamping or spinning or a combination of both processes. The article can be produced very inexpensively therefore, because both die stamping and spinning processes make it possible to produce the article rapidly and in large numbers with a minimum of labor costs. The adaptability of this portion of the device to be produced by spinning is accounted for by the fact that any transverse section of the article, regardless of where that section may be taken, is of truly circular form.

A measuring wheel indicated in its entirety at 21 is cooperatively mounted within the hopper 6. This measuring wheel 21 comprises preferably a hub portion 22 rigidly secured upon a shaft 23 extending axially therethrough, and a plurality of, preferably eight, blades 24 rigid with the hub portion 22 and extending radially outwards therefrom at equally spaced angular distances about the axis of the shaft 23. As is best shown in Figure 3 each of the blades 24 is of semicircular form being disposed with its diametric side at the hub 22 and with its semicircular side or peripheral edge outward away from the hub 22. Consequently, each two diametrically opposed blades 24 defines a full circle; and the diameter of the circle thus defined by each two opposing pairs of blades 24 corresponds closely to the inside diameter of the hemispherical measuring chamber 11.

The shaft 23 is revolubly mounted in the lower end of the bell-shaped hopper 6 in such position that its axis lies in the plane of the upper end of the hemispherical measuring chamber 11; and since the radius of each of the semicircular blades 24 corresponds to the radius of the semicircular measuring chamber 11 the peripheral edge of each blade 24 makes wiping or frictional contact with the interior surface of the measuring chamber 11 at all times when that blade is in any position lower than the horizontal plane which includes the axis of the shaft 23. Moreover, owing to the hemispherical form of the measuring chamber 11 in cooperation with the semicircular form of each of the blades 24, this wiping contact of the edge of each blade with the interior surface of the measuring chamber whenever the blade is in position extending either horizontally or in any position below the horizontal, maintained throughout the entire length of the blade's semicircular edge except when the blade actually is in registry with the outlet opening 17. The outlet opening 17, while preferably relatively large should not be so large that the remaining portion 26 of the hemispherical surface of the measuring chamber is less than 45° upon each side of the outlet opening 17, the reason being that this will assure that at least one of the blades 24 makes contact with the interior surface of the measuring chamber upon each side of the outlet opening regardless of the position to which the measuring wheel 21 is turned. This feature is of importance in that it prevents free flow of the ground coffee around the measuring wheel and assures that only measured quantities of the granular material can escape, that quantity being the amount entrapped between each two adjacent blades 24 and the rounded interior surface of the measuring chamber. Preferably, the parts are so proportioned and arranged that this quantity, i. e., the amount entrapped between two adjacent blades, corresponds substantially to one-half tablespoon so that by first turning the coffee can upside down to the position illustrated in Figures 1, 2, and 3, and then by rotating the measuring wheel 21 through a quarter turn, thus causing two adjacent blades 24 to pass a given position, a full tablespoon of ground coffee will be dispensed, this being a desirable size for the apparatus inasmuch as one full tablespoon of ground coffee is the amount ordinarily recommended as a unit of measure in coffee making.

Means are provided not only for turning the measuring wheel 21 so as to operate the measuring wheel 21 in the manner described but also for indicating when the wheel has been turned through a predetermined angular distance. Inasmuch as the shaft 23 in the lower end of the hopper 6 and since the hopper is composed of relatively thin sheet metal, it is preferred that both ends of the shaft 23 project through the hopper 6 and for a sufficient distance beyond the exterior surface of the hopper to assure retention of the ends of the shaft in proper operative relation. One end 31 of the shaft 23 is considerably longer than the other end and has a manually operable handle 32 rigidly secured thereon. In the modification illustrated, the handle 32 is square, and is so proportioned that as it is rotated about the axis of its shaft 23, its corners successively engage a detent 33 which conveniently is in the form of a raised portion struck outwardly from a wall of the hopper 6. Preferably each of the corners of the handle has a slight depression 34 formed therein within which the detent 33 is adapted to seat (as shown in broken lines in Figure 2), but with only sufficient firmness for the releasable retention of the handle in the position which it then occupies. Consequently, the raised portion or detent 33, in cooperation with the depressions 34 in the corners of the handle, operates after the fashion of a "click mechanism" indicating to the operator when the handle has been turned through a full quarter turn and also serving to releasably retain the handle in fixed position against inadvertent rotation and until the operator intentionally turns it from any one of the positions in which it is releasably retained by the raised portion for detent 33.

Figure 4 illustrates a slightly modified form of "click mechanism" wherein a cartridge 41 is seated within a hole 42 in one side of the bell-shaped hopper 6 and rigidly retained therein by frictional engagement or by actually being soldered in position. The cartridge 41 is of substantially cylindrical form but with its outer end 43 crimped inward slightly so that the diameter of the opening defined thereby is slightly less than the diameter of a ball 44 disposed within the cartridge 41. A coil spring 46 under compression between the ball 44 and the bottom 47 of the cartridge urges the ball 44 outwards into position to be engaged successively by the indented corners 48 of a square handle 49 similar to the handle 32 previously described.

I claim:

1. A measuring and dispensing device of the character described, comprising a hopper, means at the bottom of said hopper defining a measuring chamber of hemispherical form opening at its top into said hopper and having a discharge opening in its under side, a shaft revolubly mounted in said hopper and extending thereacross in the plane of the top of said measuring chamber, a measuring wheel rigid with said shaft and comprising a plurality of radially extending blades, each of said blades being of semicircular form about a radius substantially corresponding to the radius of said hemispherical measuring chamber whereby each of said blades frictionally engages the surface of said measuring chamber throughout the entire length of its semicircular edge, and means for turning said shaft to cause each of said blades alternately to enter said measuring chamber, passing said discharge opening while disposed therein, and then to move entirely out of said measuring chamber into said hopper whereby the semi-circular edge of the blade is completely removed from contact with said measuring chamber.

2. A measuring and dispensing device of the character described, comprising a hopper, means at the bottom of said hopper defining a measuring chamber of hemispherical form opening at its top into said hopper and having a discharge opening in its under side, a shaft revolubly mounted in said hopper and extending thereacross in the plane of the top of said measuring chamber, a measuring wheel rigid with said shaft and comprising a plurality of radially extending blades, each of said blades being of semicircular form about a radius substantially corresponding to the radius of said hemispherical measuring chamber whereby each of said blades frictionally engages the surface of said measuring chamber throughout the entire length of its semicircular edge, a handle carried by said shaft outside said hopper for rotating said shaft and measuring wheel to cause each of said blades alternately to enter said measuring chamber, passing said discharge opening while disposed therein, and then to move entirely out of said measuring chamber into said hopper whereby the semi-circular edge of the blade is completely removed from contact with said measuring chamber, and means associated with said handle for indicating when said wheel has turned through a predetermined distance.

CECIL EDGAR MAY.

REFERENCES CITED

The following references are of record in the file of this patent:

UNITED STATES PATENTS

| Number | Name | Date |
| --- | --- | --- |
| 895,346 | Dacosta | Aug. 4, 1908 |
| 1,702,300 | Humphrey | Feb. 19, 1929 |
| 1,866,294 | Chott | July 5, 1932 |
| 1,869,120 | Thoeming et al. | July 26, 1932 |
| 2,054,743 | Fend | Sept. 15, 1936 |
| 2,080,867 | Mast | May 18, 1937 |
| 2,152,632 | Cassiere | Apr. 4, 1939 |
| 2,190,111 | Zeller | Feb. 13, 1940 |
| 2,315,244 | Campbell | Mar. 30, 1943 |
| 2,401,684 | Gumilar | June 4, 1946 |